United States Patent [19]

Hackl et al.

[11] Patent Number: 4,748,195
[45] Date of Patent: May 31, 1988

[54] FLAME-RESISTANT, THERMOPLASTIC POLYURETHANE ELASTOMERS, PROCESS FOR THEIR PREPARATION, AND THEIR USE

[75] Inventors: Christa Hackl, Bad Essen; Dietrich Wagner, Osnabrueck; Hans M. Rombrecht, Quernheim, all of Fed. Rep. of Germany

[73] Assignee: BASF Aktiengesellschaft, Ludwigshafen, Fed. Rep. of Germany

[21] Appl. No.: 939,355

[22] Filed: Dec. 8, 1986

Related U.S. Application Data

[63] Continuation-in-part of Ser. No. 819,925, Jan. 17, 1986, abandoned.

[30] Foreign Application Priority Data

Jan. 21, 1985 [DE] Fed. Rep. of Germany ... 35.01762

[51] Int. Cl.$^4$ .......................... C08K 3/38; C08K 3/22
[52] U.S. Cl. ..................... 523/445; 523/453; 524/405; 524/412; 524/590; 524/780; 524/783
[58] Field of Search ............... 524/405, 412, 590, 780, 524/783; 523/445, 460; 525/453

[56] References Cited

U.S. PATENT DOCUMENTS

| | | | |
|---|---|---|---|
| 3,560,441 | 2/1971 | Schwarcz | 524/405 |
| 3,970,716 | 7/1967 | Evers et al. | 524/100 |
| 3,988,296 | 10/1976 | Bethea et al. | 524/412 |
| 4,147,678 | 4/1979 | Mao et al. | 524/412 |
| 4,150,066 | 4/1979 | Kudo et al. | 524/412 |
| 4,395,511 | 7/1983 | Tschirch et al. | 524/371 |
| 4,397,974 | 8/1983 | Goyert et al. | 524/412 |

*Primary Examiner*—Lewis T. Jacobs
*Attorney, Agent, or Firm*—John C. Demeter

[57] ABSTRACT

The invention relates to flame-resistant, thermoplastic polyurethane elastomers containing a flame-retardant additive package comprising:

(a) a compound selected from the group consisting of antimony trioxide, zinc borate and mixtures thereof,
(b) a chlorinated polyethylene, and
(c) a brominated aromatic compound, preferably selected from the group consisting of polytetrabromobis(phenol)-A-glycidyl ether), polytribromostyrene, and polytetrabromobis(phenol)-A-carbonate).

The flame-retardant additive package may be incorporated into the starting components used to prepare the thermoplastic polyurethane prior to the reaction which forms the polyurethane, to the reaction mixture during the reaction, or to the finished thermoplastic polyurethane elastomers.

The flame resistant, thermoplastic polyurethane elastomers are suitable for the preparation of, for example, molded articles, films, sheets, and cable jackets.

12 Claims, No Drawings

FLAME-RESISTANT, THERMOPLASTIC POLYURETHANE ELASTOMERS, PROCESS FOR THEIR PREPARATION, AND THEIR USE

This application is a continuation-in-part of Application Ser. No. 819,925, filed Jan. 17, 1986, now abandoned.

BACKGROUND OF THE INVENTION

1. Field of Invention

The present invention relates to thermoplastic polyurethane elastomers. More particularly, the invention relates to a flame-resistant thermoplastic polyurethane elastomer containing a flame retardant additive package comprising a chlorinated polyethylene, a brominated aromatic compound and a compound selected from the group consisting of antimony trioxide, zinc borate, and mixtures thereof. Additionally, the invention relates to a process for the preparation of the flame retardant polyurethane elastomers and their use in the preparation of molded articles, films and cable jackets.

2. Description of Prior Art

Thermoplastic polyurethane elastomers have been known for a long time. Their commercial utility is based on their ability to combine desirable mechanical properties with the advantages of economic thermoplastic processing. A wide range of mechanical properties can be achieved by using different starting materials. An overview of thermoplastic polyurethane elastomers, their properties and applications, is given in *Kunststoffe* 68 (1978), pp. 819-825, or in *Kautschuk, Gummi, Kunststoffe* 35 (1982), pp. 568-584.

Thermoplastic polyurethane elastomers can be produced either continuously or by batch processes. The most well known of the continuous processes, the so-called sheet process and the extrusion process, are widely used on a commercial scale.

In British Pat. No. 1,057,018, for example, a prepolymer is prepared from an essentially linear hydroxyl compound and excess organic diisocyanate, fed into a mixing head through a metering pump, and mixed therein with a specified amount of a low-molecular-weight diol. The resulting reaction mixture is fed onto a conveyor belt and passed through an oven heated to from 70° to 130° C. until it solidifies. The reaction product is then granulated and tempered at temperatures up to 120° C. for from 6 to 40 hours. The resulting product can then be processed into molded parts by the usual methods, for example, by injection molding.

In the extrusion process, which is described in German Pat. No. 20 59 570 (U.S. Pat. No. 3,642,964), the starting components are fed directly into the extruder and the reaction is performed in the extruder under the specified process conditions. The resulting polyurethane elastomer is converted into a thermoplastic directly, extruded as a strand, cooled in an inert gas atmosphere until it solidifies, and is then granulated. The disadvantage of this process is that the resulting thermoplastic polyurethane elastomer is not suitable for producing sheets, fine sections, and tubing or hose. Thermoplastic polyurethane elastomers of identical composition are transparent when made by the extrusion process, but have an opaque appearance when made by the continuous sheet process. Opaque thermoplastic polyurethane elastomers can be processed into sheets which are not subject blocking. However, transparent thermoplastic polyurethane elastomers are not suitable for this purpose.

Halogen-containing organic compounds may be incorporated in thermoplastic polyurethanes in order to improve flame retardancy. In addition, a series of metal oxides such as ZnO, $B_2O_3$, $Fe_2O_3$, CaO and $Sb_2O_3$ can be added to increase flame retardancy. These compounds themselves do not exhibit a flame retarding effect, however, they do act synergistically with the organically bound halogen. The most effective system has been found to be antimony(III)oxide/halogen (see W. C. Kuryla and A. J. Lapa, *Flame Retardancy of Polymeric Materials*, Vol. 3, (New York: Verlag Marcel Dekker, 1975).

According to Federal Republic of Germany Pat. No. 25 24 817 (U.S. Pat. No. 3,970,716), nonflammable thermoplastic polyurethane compositions contain chlorinated polyethylene, a chlorinated cyclopentadien adduct, and optionally antimony trioxide. Federal Republic of Germany Offenlegungsschrift No. 29 01 774 describes a free flowing polyurethane elastomer concentrate containing a dye and/or an auxiliary including a flame retardant such as bromodiphenyl ether, brominated polystyrene, brominated polycarbonate and antimony trioxide.

U.S. Pat. No. 4,395,511 relates to thermoplastic polyurethanes containing a mixture of decabromodiphenyloxide and antimony trioxide as the flame retardant, optionally in combination with ammonium polyphosphate.

European Pat. No. 4175 describes a mixture of polyvinyl chloride, chlorinated polyethylene, or chlorinated paraffins and zinc oxide as well as optionally antimony trioxide to reduce smoke gas density.

The products described above all have the disadvantage that wear resistance and other mechanical properties of the thermoplastic polyurethane are adversely affected by adding the multiple-substance additives. Moreover, a particular disadvantage is that some of the low-molecular weight substances used to improve flame retardancy, for example, the chlorinated cyclopentadien adducts described in Federal Republic of Germany Pat. No. 2 524 817 and the highly brominated aromatic products such as decabromodiphenylether eventually effloresce, from the films, molded articles, tubes, hoses, and cable jackets, forming a coating on the surface of the article which is undesirable in many applications.

U.S. Pat. No. 4,397,974 generally discloses low halogen content thermoplastic polyurethanes containing a special additive mixture consisting of from 1 to 10 percent by weight antimony trioxide; 0.3 to 6 percent by weight chlorinated and/or brominated aromatic compounds having a halogen content of from 50 to 88 percent by weight; 1 to 8 percent by weight aluminum hydroxide; and 0.2 to 4 percent by weight phosphoric acid triesters; and optionally further containing up to 5 percent by weight quarternary tetraalkyl ammonium salts.

The beneficial advantages of the present invention are obtained without the necessity of including aluminum hydroxide or phosphoric acid triesters or quarternary tetraalkyl ammonium salts.

U.S. Pat. No. 4,150,066 generally discloses a flame retarding composition consisting of a mixture of (A) a first graft copolymer; (B) a second graft copolymer; (C) a chlorinated polyetheylene; (D) tetrabromobisphenol A or a derivative thereof; and (E) antimony trioxide.

U.S. Pat. No. 4,147,678 generally discloses flame retardant cross-linked polyurethane elastomer compositions. These compositions are prepared from an elastomeric cross-linkable polyurethane prepolymer; a halogen containing compound; an antimony compound; and a hexaalkoxy methyl melamine.

The beneficial advantages of the present invention are obtained without the necessity of including a hexaalkoxy methylmelamine. Further, such markedly cross-linked material is unsuitable for thermoplastic processing.

U.S. Pat. No. 3,560,441 generally discloses compositions for imparting flame retarding properties to polyolefins which comprise an admixture of antimony trioxide with an inorganic salt.

U.S. Pat. No. 3,988,296 generally discloses flame-retardant polyolefins which are said to include certain defined polyalkylenes. The brominated aromatics disclosed as fire retardants suitable for use with polyolefins effloresce or migrate from polyurethane, particularly when used with thermoplastic polyurethane.

It is known by those skilled in the art that polymers, particularly polyolefins, and additives, such as plasticizers and flame retardants, vary widely with respect to their polarity. Combinations of such materials must, therefore, be precisely matched, particularly with respect to flame retardants, to each other to prevent efflorescence or exudation of the flame retardant. The suitability of a specific flame retardant for use with polyolefins is not indicative of its suitability for use with polyurethanes in general or thermoplastic polyurethane in particular. Many examples are known by those skilled in the art of flame retardants suitable for use with polyolefins which are completely unsuitable for use with polyurethanes.

SUMMARY OF THE INVENTION

The objective of the subject invention was to overcome the disadvantages described above. In particular, the adverse affect on mechanical properties of thermoplastic polyurethanes by adding flame retardant substances and efflorescence of flame retarding agents from stored semifinished and finished articles. This objective was unexpectedly met by a specific combination of flame retardant compounds.

Thus, the invention relates to a flame-resistant thermoplastic polyurethane elastomer containing a flame-retardant additive package comprising;
(a) a compound selected from the group consisting of antimony trioxide, zinc borate, and mixtures thereof,
(b) a chlorinated polyethylene, and
(c) a brominated aromatic compound having a molecular weight of at least about 1700.

The invention further relates to a process for the preparation of the flame-resistant polyurethane elastomers and their use in the preparation of molded articles, films, and cable jackets.

DESCRIPTION OF PREFERRED EMBODIMENT

Suitable thermoplastic polyurethane elastomers, which are made flame-resistant through the addition of the flame retardant package of the invention, differ greatly from one another in chemical composition. The flexible thermoplastic polyurethane elastomers, for example those having a hardness of Shore A 80 contain a low concentration of hard phase components, i.e., low parts by weight diisocyanate and difunctional low molecular weight chain extenders, and a high percentage of soft phase components, i.e., a high percent by weight higher molecular weight polyhydroxyl compounds. The rigid thermoplastic polyurethane elastomers, having for example a Shore A hardness of 98, contain a high concentration of hard phase constituents and a low concentration of soft phase constituents. The parts by weight of the flame-retardant package of this invention as needed to achieve good flame resistance becomes lower when the thermoplastic polyurethane elastomer is more rigid. Moreover, experience teaches that polyester thermoplastic polyurethane elastomers can be made flame-resistant with relatively small concentrations of the flame-retardant package of the invention. By contrast, polyether thermoplastic polyurethane elastomers having the same Shore hardness require higher concentrations of the flame retardant combination of the invention in order to exhibit flame resistance. Given these experimental findings, the necessary concentrations of the flame retardant compounds vary over wide ranges, depending upon the type and hardness of the thermoplastic polyurethane elastomer.

In order to achieve very good flame resistance, preferably, the following compounds, per 100 parts by weight thermoplastic polyurethane elastomer, comprise the additive package:
(a) from 2 to 10 parts by weight, preferably from 3 to 8 parts by weight, of a compound selected from the group consisting of antimony trioxide, zinc borate, and mixtures thereof,
(b) from 5 to 10 parts by weight, chlorinated polyethylene, and
(c) from 5 to 10 parts by weight, of a brominated aromatic compound having a molecular weight of at least about 1700, preferably from about 1700 to about 63,000.

It is preferable to use the antimony trioxide (a) in finely ground form. Products having an average particle size of approximately 1.0 to 5.0 $\mu$m, preferably from 1.2 to 1.6 $\mu$m, have proven particularly effective.

It is preferable to use a zinc borate which has the following purely computational content: 37.5 percent by weight zinc oxide, 48.0 percent by weight diboron trioxide, and 14.5 percent by weight water. The water of hydration in this zinc borate is not released, even at temperatures of 260° C. The zinc borate particles are less than 50 $\mu$m in size, preferably from 1 to 10 $\mu$m. Instead of antimony trioxide or zinc borate, mixtures of these compounds can be used, whereby the ratios of the compounds can vary across wide ranges.

Preferably, polymers having a chlorine content of from 25 to 45 percent by weight, more preferably from 20 to 40 percent by weight, and a melt flow index (190° C./21.6 Kp/10 min.) of from 1 to 40, preferably from 2 to 10, are used as the chlorinated polyethylene (b). Particularly well suited is chlorinated polyethylene which has been stabilized against thermal decomposition. Here the chlorinated polyethylenes in accordance with DIN 53 735 are stabilized by essentially known additives so that no noticeable decomposition occurs at the temperature at which the thermoplastic polyurethane elastomers are processed, i.e., at temperatures up to approximately 260° C.

Suitable brominated aromatic compounds (c) have a bromine content of from 40 to 85 percent by weight, preferably from 45 to 81 percent by weight and a molecular weight of at least about 1700, preferably from about 1700 to about 63,000. Especially effective and thus preferred are compounds selected from the group consisting of polytribromostyrene, poly(tetrabromobisphenol-A-carbonate) and poly(tetrabromobisphenol-A-glycidylether). Most preferred is poly(tetrabromobisphenol-A-glycidylether). As understood in the invention, polytetrabromobisphenol-A-glycidylethers are those products which are formed by, for example, the reaction of tetrabromobisphenol-A with epoxies (oxiranes) or dichloroalkanes. Such products have the following chemical structure:

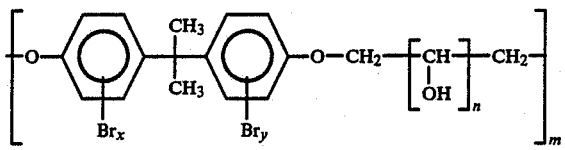

in which x, y=2, n=0 to 2 and m=3 to 100.

Depending upon the way they are produced, the products may contain terminal oxiran groups, which can be reacted with mono- and polyfunctional chemical compounds having reactive hydrogen atoms, such as aliphatic and/or aromatic mono- or polyamines, or tertiary amino group-containing compounds. The aromatic brominated compounds may be used individually or in the form of mixtures or concentrates.

In order to prepare the flame resistant thermoplastic polyurethane elastomers, components (a) through (c) of the flame-retardant package may be incorporated individually or in the form of a mixture of at least two of the components into one or several starting materials used to prepare the thermoplastic polyurethane elastomers prior to the reaction, to the reaction mixture during the reaction in which the polyurethane is formed, or to the finished thermoplastic polyurethane elastomer. Components (a) through (c) may be added simultaneously or sequentially in a suitable sequence. In one of the preferred embodiments, a concentrate batch is prepared from one or more of the components and this is worked into the thermoplastic polyurethane elastomer. For example, the following versions of the process used to incorporate components (a) through (c) of the flame-retardant package. A concentrate of the components (a) through (c) and thermoplastic polyurethane elastomer is prepared, and this concentrate, together with an untreated thermoplastic polyurethane elastomer, is processed further into the flame-resistant thermoplastic polyurethane elastomer of the invention. The brominated aromatic compound and the antimony trioxide and/or zinc borate are dispersed to form a concentrate in a matrix of a thermoplastic chlorinated polyethylene, preferably one which has been stabilized against thermal decomposition. The dispersion is then worked into an untreated thermoplastic polyurethane elastomer. A concentrate of approximately 90 to 95 percent by weight antimony trioxide or zinc borate or mixtures thereof in polyethylene is incorporated in the untreated thermoplastic polyurethane elastomer together with a concentrate of the brominated aromatic compound in chlorinated polyethylene. A concentrate of thermoplastic polyurethane elastomer of each of the components (a) through (c) of the flame-retardant package is prepared and these concentrates are simultaneously or sequentially worked into untreated thermoplastic polyurethane elastomer. A concentrate is prepared from antimony trioxide and/or zinc borate and a polymeric brominated aromatic compound, and this concentrate is processed further with untreated thermoplastic polyurethane elastomer and with chlorinated polyethylene which has preferably been stabilized against thermal decomposition. Components (a) through (c) are simultaneously or non-simultaneously mixed with one or more of the starting materials used to prepare the thermoplastic polyurethane elastomer and/or with the reaction mixture and are then reacted to form the thermoplastic polyurethane elastomer of the invention. Also, a portion of components (a) through (c) of the flame-retardant additive package can be incorporated in the starting substances used to prepare the thermoplastic polyurethane elastomer or into the reaction mixture, and the remaining components worked into the resulting thermoplastic polyurethane elastomer as a concentrate.

The concentrate may be prepared in essentially known manners, for example as described in Federal Republic of Germany Offenlegunsschrift No. 29 01 774.

Conventionally, the concentrates are prepared in an essentially known manner on heatable kneaders by mixing, for example, antimony trioxide and/or zinc borate with chlorinated polyethylene which has been stabilized against thermal decomposition, the brominated aromatic compound and thermoplastic polyurethane elastomer, and are then granulated. As tests have shown, concentrates produced on kneaders with, for example, antimony trioxide, zinc borate or mixtures thereof in chlorinated polyethylene which has been stabilized against thermal decomposition and thermoplastic polyurethane elastomers mixed with concentrates of bromated aromatic compounds in thermoplastic polyurethane elastomer prepared in a similar manner, exhibit just as much flame resistancy when they are added to the stabilized thermoplastic polyurethane elastomer in amounts corresponding to the invention. Of course, concentrates of the individual components (a) through (c) may also be prepared using the kneader process, for example, concentrates of antimony trioxide, zinc borate or mixtures thereof, in thermoplastic polyurethane elastomers or of antimony trioxide, zinc borate or mixtures thereof in polyethylene or in chlorinated polyethylene which has been stabilized against thermal decomposition, concentrates of brominated aromatic compounds in thermoplastic polyurethane elastomers or chlorinated polyethylene, concentrates of chlorinated polyethylene which have been stabilized against thermal decomposition in thermoplastic polyurethane elastomers. Thermoplastic polyurethane elastomers also become flame resistant through the use of mixtures of these individual concentrates, provided that the amounts of additive specified in the invention are contained in the thermoplastic polyurethane elastomer.

Components (a) through (c) of the combination are incorporated in the starting materials used to prepare the thermoplastic polyurethane elastomer at temperatures from 20° to 150° C. The incorporation of components (a) through (c) or of the concentrates in the reaction mixture or in the finished, untreated thermoplastic polyurethane elastomer is performed at temperatures from 50° C. to 260° C., preferably from 50° C. to 240° C., for example when the thermoplastic polyurethane elastomer is in a flowable, softened, or molten state, using, for example, mixers, rolling mills, kneaders or extruders, for example using a double-screw or pressure injection mixing extruder or a kneader.

The flame retardant thermoplastic polyurethane elastomers of the invention contain as the basic polymer, thermoplastic polyurethane elastomers prepared using the extruder or, preferably, the sheet process. Such polymers may be prepared, for example, through the reaction comprising (d) an organic diisocyanate,
(e) a polyhydroxyl compound having a molecular weight from 500 to 8000, and
(f) a chain extender having a molecular weight from 60 to 400,
optionally in the presence of
(g) a catalyst,
(h) and auxiliaries or additives.

A typical organic diisocyanate (d) is aliphatic, cycloaliphatic, and, preferably, an aromatic diisocyanate. Specific examples include an aliphatic diisocyanate such as hexamethylene diisocyanate, cycloaliphatic diisocyanates such as isophorone diisocyanate, 1,4-cyclohexane diisocyanate, 1-methyl-2,4-cyclohexane diisocyanate, and 1-methyl-2,6-cyclohexane diisocyanate, as well as the corresponding isomer mixtures, 4,4'-dicyclohexylmethane diisocyanate, 2,4'-dicyclohexylmethane diisocyanate, and 2,2'-dicyclohexylmethane diisocyanate as well as the corresponding isomer mixtures, and, preferably, an aromatic diisocyanate such as 2,4-toluene diisocyanate, mixtures of 2,4-toluene diisocyanate and 2,6-toluene diisocyanate, 4,4'-diphenylmethane diisocyanate, 2,4'-diphenylmethane diisocyanate, and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and/or 2,4'-diphenylmethane diisocyanates, 4,4'-diisocyanato-1,2-diphenylmethane and 1,5-naphthylene diisocyanate. Preferably used are hexamethylene diisocyanate, isophorone diisocyanate, 1,5-naphthylene diisocyanate, diphenylmethane diisocyanate isomer mixtures having a 4,4'-diphenylmethane diisocyanate content greater than 96 percent by weight and, more preferably, 4,4'-diphenylmethane diisocyanate.

Particularly suitable for use as the higher molecular weight polyhydroxyl compound (e) having a molecular weight from 500 to 8000 are polyether polyols and polyester polyols. However, hydroxyl group-containing polymers may also be used, for example, polyacetals such as polyoxymethylene and, above all, non-water-soluble formals, for example polybutanediolformal and polyhexanediolformal, and polycarbonates, in particular those formed from diphenylcarbonate and 1,6-hexanediol through transesterification, having the molecular weight cited above. The polyhydroxyl compounds must at least be primarily linear, in other words, they must have a difunctional structure with respect to the isocyanate reaction. The cited polyhydroxyl compounds may be used as individual components or in the form of mixtures.

A suitable polyether polyol may be prepared by reacting one or more alkylene oxides having from 2 to 4 carbon atoms in the alkylene radical with an initiator which contains two active hydrogen atoms in bonded form. A typical alkylene oxide is, for example, ethylene oxide, 1,2-propylene oxide, epichlorohydrin, and 1,2-butylene oxide and 2,3-butylene oxide. Ethylene oxide and mixtures of 1,2-propylene oxide and ethylene oxide are preferably used. The alkylene oxides may be used individually, one after another, or as a mixture. A typical initiator is water, amino alcohols such as N-alkyldiethanolamines, for example N-methyldiethanolamine, and diols such as ethylene glycol, 1,3-propylene glycol, 1,4-butanediol, and 1,6-hexanediol. Optionally, an initiator may be used as a mixture. Suitable polyether polyols are also the hydroxyl group-containing polymerization products of tetrahydrofuran (polyoxytetramethylene glycols). Preferably used are polyether polyols produced from 1,2-propylene oxide and ethylene oxide in which more than 50 percent, preferably from 60 to 80 percent of the hydroxyl groups are primary hydroxyl groups, and in which at least part of the ethylene oxide is present as a terminal block, in particular the polyoxytetramethylene glycols. Such polyether polyols may be obtained by polymerizing the 1,2-propylene oxide onto the initiator followed by the ethylene oxide or by first copolymerizing the entire 1,2-propylene oxide in a mixture with part of the ethylene oxide and then polymerizing on the remainder of the ethylene oxide, or in a step-by-step fashion, by first polymerizing onto the initiator part of the ethylene oxide, then the entire 1,2-propylene oxide, and then the remainder of the ethylene oxide. The essentially linear polyether polyols have molecular weights from 500 to 8000, preferably from 600 to 6000, and more preferably from 800 to 3500, and can be used individually and in the form of mixtures.

A suitable polyester polyol may be prepared, for example, from a dicarboxylic acid having from 2 to 12 carbon atoms, preferably from 4 to 6 carbon atoms, and a polyfunctional alcohol. Typical carboxylic acids are aliphatic dicarboxylic acids such as succinic acid, glutaric acid, adipic acid, suberic acid, azelaic acid, and sebacic acid, and aromatic dicarboxylic acids such as phthalic acid, isophthalic acid, and terephthalic acid. The dicarboxylic acids may be used individually or as mixtures, for example, in the form of a succinic, glutaric, and adipic acid mixture. By the same token, mixtures of aromatic and aliphatic dicarboxylic acids may be used. In order to prepare a polyester polyol, it may be advantageous to use the corresponding dicarboxylic acid derivatives instead of the dicarboxylic acids, for example dicarboxylic acid esters having from 1 to 4 carbon atoms in the alcohol radical, dicarboxylic anhydrides, or dicarboxylic chlorides. Typical examples of polyfunctional alcohols are glycols having from 2 to 10, preferably from 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol, and dipropylene glycol. Depending on the properties which are desired, the polyfunctional alcohols may be used alone or, optionally, in mixtures with one another.

Also suitable are esters of the carboxylic acids with the diols cited above, in particular those having from 4 to 6 carbon atoms, such as 1,4-butanediol and/or 1,6-hexanediol, condensation products of ω-hydrocarboxylic acids, optionally ω-hydrocaproic acid, and preferably polymerization products of lactones, for example optionally substituted ω-caprolactones. Preferably used as polyester polyols are ethanediol polyadipates, 1,4-butanediol polyadipates, ethanediol-butanediol-1,4-polyadipates, 1,6-hexanediol-neopentyl glycol polyadipates, polycaprolactones, and more preferably, 1,6-hexanediol-1,4-butanediol polyadipates. The polyester polyols have molecular weights from 500 to 6000, preferably from 800 to 3500.

Preferably used as chain extenders (f) having molecular weights from 60 to 400, preferably from 60 to 300, are aliphatic diols having from 2 to 12 carbon atoms, preferably 2, 4, or 6 carbon atoms, such as ethanediol, 1,6-hexanediol, diethylene glycol, dipropylene glycol, and more preferably 1,4-butanediol. However, diesters of the phthalic acids with glycols having from 2 to 4 carbon atoms are also suitable, for example terephthalic acid bis(ethylene glycol) or terephthalic acid bis(1,4-butanediol), hydroxyalkylene ethers of hydroquinone, for example 1,4-di(β-hydroxyethyl)hydroquinone, (cyclo)aliphatic diamines such as 4,4'-diaminodicyclohexylmethane, 3,3'-dimethyl-4,4'-diaminodicyclohexylmethane, isophoronediamine, ethylenediamine, 1,2-propylenediamine, 1,3-propylenediamine, N-methyl-1,3-propylenediamine, N-N'-dimethylethylenediamine, and aromatic diamines such as 2,4-toluenediamine and 2,6-toluenediamine, 3,5-diethyl-2,4-toluenediamine and 3,5-diethyl-2,6-toluenediamine, and primary ortho di-, tri-, and/or tetra-alkyl-substituted 4,4'-diaminodiphenylmethanes.

The starting components (e) and (f) can be varied in relatively broad molar ranges in order to adjust hardness and melting point of the thermoplastic polyurethane elastomers. Molar ratios of polyhydroxyl compounds (e) to chain extenders (f) of from 1:1 to 1:12, preferably from 1:1.8 to 1:6.4, have proven effective, whereby the hardness and the melting point of the thermoplastic polyurethane elastomer increases as the diol content increases.

In order to prepare the thermoplastic polyurethane elastomers, the starting components (d), (e), and (f) are reacted in the presence of optional catalyst (g), and auxiliaries or additives (h) in such amounts that the equivalent ratio of isocyanate groups in the diisocyanates to the sum of the hydroxyl groups or hydroxyl and amino groups in the (b) and (c) components is 1:0.85 to 1:1.20, preferably 1:0.95 to 1:1.05, more preferably 1:0.98 to 1:1.02.

Suitable catalysts (g) which in particular accelerate the reaction between the isocyanate groups in the diisocyanates (d) and the hydroxyl groups in components (e) and (f) are known in the prior art and are the conventional tertiary amines such as triethylamine, dimethylcyclohexylamine, N-methylmorpholine, N-N'-dimethylpiperazine, 2-(dimethylaminoethoxy)ethanol diazobicyclo(2.2.2)octane and similar metal compounds, in particular those which are organic, such as titanium acid esters, iron compounds such as iron(III)acetylacetonate, tin compounds such as tin diacetate, tin dioctoate, tin dilaurate, or the tin dialkyl salts of aliphatic carboxylic acids such as dibutyl tin diacetate, dibutyl tin dilaurate, etc. These catalysts are generally used in amounts from 0.001 to 0.1 parts per 100 parts polyhydroxyl compound.

In addition to a catalyst, the components also include auxiliaries or additives (h). Typical examples are lubricants, inhibitors, stabilizers against hydrolysis, light, heat, or discoloration, dyes, pigments, organic and/or inorganic fillers, reinforcing materials, and plasticizers. Additional information on the auxiliaries and additives referred to above may be found in the technical literature, for example, the monograph by J. H. Saunders and K. C. Frisch, *High Polymers*, Vol. 16 of *polyurethane*, parts 1 and 2, (Interscience Publishers: 1962 and 1964) or Federal Republic of Germany OS No. 29 01 774.

As already stated, the thermoplastic polyurethane elastomer is produced using an extruder process, preferably a continuous sheet process. The specific steps in the continuous sheet process are as follows: Components (d) through (f) and optionally (g) and/or (h) are continuously mixed at temperatures above the melting point of components (d) through (f) with the aid of a mixing head. The reaction mixture is fed onto a carrier, preferably a conveyor belt, and is passed through a temperature-controlled zone. The reaction temperature in this temperature controlled zone is from 60° to 200° C., preferably from 100° to 180° C., and the residence time is from 0.05 to 0.5 hours, preferably from 0.1 to 0.3 hours.

After completion of the reaction, the thermoplastic polyurethane elastomer, which has a hardness of Shore A 60 to Shore D 74, preferably from Shore A 60 to Shore 98, is allowed to cool, reduced in size or granulated, and temporarily stored or directly mixed with the flame retarding additive, provided that this additive was not already added in the preparation of components (d) through (f) or of the reaction mixture.

In the extruder process, components (d) through (f) and optionally components (a) through (c) of the flame retardant additive package are individually fed into the extruder or are fed in as a mixture and then caused to react. However, the extruded thermoplastic polyurethane elastomer can also have the flame-retarding additives (a) through (c) incorporated in it at a later time.

The flame-resistant thermoplastic polyurethane elastomers of the invention are suitable for the preparation of coated woven fabrics, for example those produced from glass, carbon, polymers, or textile fibers such as are used in the automotive, railway, or aircraft industry. They are also suitable for pipes, tubes, hoses, or cables. However, they are preferably used to prepare molded articles, films, sheets, and cable jackets.

The parts cited in the Examples are parts by weight.

EXAMPLES 1–7 AND COMPARISON EXAMPLE I AND II

A thermoplastic polyurethane elastomer was prepared using the reaction extrusion or the continuous sheet process. The elastomer was prepared at a temperature of from 50° to 200° C. from a polyoxytetramethylene glycol (PTHF) having a molecular weight of 1000 and/or a 1,4-butanediol-1,6-hexanediol polyadipate (Bu-He polyadipate) having a molecular weight of 2000, 4,4'-diphenylmethanediisocyanate (4,4'-MDI), and 1,4-butanediol (1,4-BuOH). Th resulting thermoplastic polyurethane had a hardness of Shore A 80 to 98, a primary melting point per DSC of from 150° to 210° C., and a melt viscosity, a melt flow index (MFT), at 190° C. loaded with a weight of 21.6 kp of from 1 to 80 or at 200° C./21.6 kp of from 1 to 10. The thermoplastic polyurethane and the flame-retardant additive package were melted at a temperature of 160° to 210° C. in a Werner and Pfleiderer double screw extruder, mixed, and pressed into strands through a multi-hole nozzle. After cooling, the specimen was cut into granulate using the conventional method. The flame-resistant thermoplastic polyurethane elastomer granulate was then molded into test plaques at from 160° to 210° C. The components which were used and their amounts as well as the mechanical properties of the test plaques are shown in Table I below.

TABLE I

|  | Examples | | | | | | | Comparison Examples | |
| --- | --- | --- | --- | --- | --- | --- | --- | --- | --- |
|  | 1 | 2 | 3 | 4 | 5 | 6 | 7 | I | II |
| PTHF (pbw) | 1000 | 1000 | — | — | 500 | 1000 | 1000 | 1000 | 1000 |

TABLE I-continued

| | Examples | | | | | | | Comparison Examples | |
|---|---|---|---|---|---|---|---|---|---|
| | 1 | 2 | 3 | 4 | 5 | 6 | 7 | I | II |
| Bu—He—polyadipate (pbw) | — | — | 1000 | 1000 | 500 | — | — | — | — |
| 4,4'-MDI (pbw) | 400 | 1200 | 350 | 1600 | 400 | 400 | 400 | 425 | 460 |
| 1,4-BuOH (pbw) | 80 | 340 | 86 | 530 | 80 | 80 | 80 | 106 | 118 |
| Antimony trioxide (pbw) | 100 | 160 | 90 | 190 | 95 | 50 | — | 100 | 100 |
| Zinc borate (pbw) | — | — | — | — | — | 50 | 100 | — | — |
| Chlorinated polyethylene (pbw) | 145 | 245 | 135 | 100 | 140 | 145 | 140 | 145 | — |
| Polytetrabromobis(phenol)-A-glycidyl ether (pbw) | 145 | 245 | 135 | 100 | 140 | 145 | 150 | — | 150 |
| Mechanical Properties: | | | | | | | | | |
| Shore A hardness (DIN 53 505) | 85 | 98 | 82 | 98 | 84 | 85 | 85 | 86 | 87 |
| Tensile strength (DIN 53 504) N/mm$^2$ | 51 | 47 | 49 | 54 | 56 | 48 | 52 | 51 | 53 |
| Elongation at break (DIN 53 504) % | 690 | 370 | 650 | 450 | 590 | 540 | 610 | 550 | 520 |
| Wear (DIN 53 516) mm$^3$ | 35 | 46 | 42 | 49 | 41 | 38 | 43 | 38 | 47 |
| Density (DIN 53 550) g/cm$^3$ | 1.21 | 1.26 | 1.21 | 1.27 | 1.23 | 1.21 | 1.21 | 1.21 | 1.21 |
| Flame retardancy per VDE 0472 §804 neu | | | | | | | | | |
| Specimen self-extinguishes after sec. | 30 | 5 | 10 | 5 | 15 | 15 | 20 | burns | burns |

EXAMPLES 8–15 AND COMPARISON EXAMPLES III AND IV

A thermoplastic polyurethane elastomer was prepared from a polyoxytetramethylene glycol (PTHF) having a molecular weight of 1000 and/or a 1,2-ethanediol-1,4-butanediol polyadipate (Ed-Bu-polyadipate) having a molecular weight of 1000, 4,4'-diphenylmethane diisocyanate (4,4'-MDI) and 1,4-butanediol (1,4-BuOH). The resulting thermoplastic polyurethane had a hardness of Shore A 80 to 98 and a melting point per DSC of 140° to 200° C. and a melt viscosity, a melt flow index (MFI), at 190° C. with a loading weight of 21.6 kp of from 1 to 80, or at 200° C./21.6 kp of 1 to 10. The thermoplastic polyurethane and the flame retardant additive package were melted, mixed and pressed through a hold nozzle into strands either on a Banbury ® kneader with an attached Farell ® extruder or on a Henschel-Rheinstahl single-screw extruder. After cooling, the strands were cut into granulate in the conventional manner. The flame-resistant thermoplastic polyurethane elastomer granulate was molded into test plaques at 160° to 210° C. Table II summarizes the components and amounts used as well as the mechanical properties measured on the test plaques.

In Example 8 a granulate batch comprised of 50 parts antimony trioxide and 72.5 parts polytetrabromobis(-phenol-A-glycidyl ether) as well as the chlorinated polyethylene which was stabilized against thermal decomposition was added in granulate form to the thermoplastic polyurethane elastomer prior to complete formulation.

In Example 9, a granulate batch of 50 parts antimony trioxide and 72.5 parts of a 2,4,6-tribromophenyl-terminated polytetrabromobis(phenol-A-carbonate) as well as the chlorinated polyethylene, which was stabilized against thermal decomposition, was added in granulate form to the thermoplastic polyurethane elastomer prior to formulating.

In Example 10, a granulate batch of 25 parts antimony trioxide, 25 parts zinc borate, and 72.5 parts polytetrabromobisphenol-A-glycidyl ether as well as the chlorinated polyethyene which was stabilized against thermal decomposition, was added in granulate form to the thermoplastic polyurethane elastomer.

In Example 11, a batch of 25 parts thermoplastic polyurethane elastomer, 28 parts polytetrabromobisphenol-A-glycidyl ether, 28 parts chlorinated polyethylene, which was stabilized against thermal decomposition, and 19 parts antimony trioxide were added to the thermoplastic polyurethane elastomer.

In Example 12, a batch of 25 parts thermoplastic polyurethane elastomer, 28 parts polytetrabromobisphenol-A-glycidyl ether, 28 parts chlorinated polyethylene, which was stabilized against thermal decomposition, 9.5 parts zinc borate, and 9.5 parts antimony trioxide were added to the thermoplastic polyurethane elastomer.

In Example 13, a batch of 25 parts thermoplastic Polyurethane elastomer, 28 parts polytetrabromobisphenol-A-glycidyl ether, 2B parts chlorinated polyethylene, which was stabilized against thermal decomposition, and 19 parts zinc borate were added to the thermoplastic polyurethane elastomer.

In Example 14, a batch of 25 parts thermoplastic polyurethane elastomer, 28 parts polytetrabromobisphenol-A-glycidyl ether, 28 parts chlorinated polyethylene, which was stabilized against thermal decomposition, and 19 parts zinc borate were added to the thermoplastic polyurethane elastomer.

In Example 15, a batch of 25 parts thermoplastic polyurethane elastomer, 28 parts polytetrabromobisphenol-A-glycidyl ether, 28 parts chlorinated polyethylene, which was stabilized against thermal decomposition, and 19 parts zinc borate were added to the thermoplastic polyurethane elastomer.

In Comparison Example III, the amount of chlorinated polyethylene was increased to the point where sufficient flame resistancy was achieved. The tensile strength of this flame-resistant thermoplastic polyurethane elastomer is significantly lower. The wear is intolerably high compared to the flame-resistant thermoplastic polyurethane elastomers of the invention.

In Comparison Example IV, the amount of polytetrabromobisphenol-A-glycidyl ether was replaced by 1,2,3,4,7,8,9,10,13,13,14,14-dodecachloro-1,4,4a,5,6,6a,7,10,10a,11,12,12a-dodecahydro-1,4:7,10-dimethanodibenzo(a,e)cyclo octene. Flame resistancy is good. However, wear is intolerably high in this flame resistant thermoplastic polyurethane elastomer. Moreover, the flame-retardant additives effloresce.

TABLE II

|  | Examples | | | | | | | | Comparison Examples | |
| --- | --- | --- | --- | --- | --- | --- | --- | --- | --- | --- |
|  | 8 | 9 | 10 | 11 | 12 | 13 | 14 | 15 | III | IV |
| PTHF (pbw) | 1000 | 1000 | 1000 | 1000 | 1000 | 1000 | — | — | 1000 | 1000 |
| Bu—He—polyadipate (pbw) | — | — | — | — | — | — | 1000 | 1000 | — | — |
| 4,4'-MDI (pbw) | 400 | 400 | 400 | 400 | 400 | 400 | 400 | 400 | 400 | 400 |
| 1,4-BuOH (pbw) | 80 | 80 | 80 | 80 | 80 | 80 | 80 | 80 | 80 | 80 |
| Antimony trioxide (pbw) | 100 | 100 | 50 | 100 | 50 | — | 66 | — | 100 | 90 |
| Zinc borate (pbw) | — | — | 50 | — | 50 | 100 | — | 66 | — | — |
| Chlorinated polyethylene (pbw) | 145 | 145 | 145 | 147 | 147 | 147 | 98 | 98 | 290 | 136 |
| Cyclooctene (pbw) | — | — | — | — | — | — | — | — | — | 136 |
| Polytetrabromobis(phenol)-A-glycidyl ether (pbw) | 145 | — | 145 | 147 | 147 | 147 | 98 | 98 | — | — |
| 2,4,6-tribromophenyl-terminated polytetrabromobis(phenol)-A-carbonate-(pbw) | — | 145 | — | — | — | — | — | — | — | — |
| Mechanical Properties: | | | | | | | | | | |
| Shore A hardness (DIN 53 505) | 87 | 88 | 86 | 87 | 85 | 86 | 87 | 88 | 88 | 87 |
| Tensile strength (DIN 53 504) N/mm$^2$ | 49 | 51 | 50 | 48 | 51 | 52 | 56 | 50 | 22 | 38 |
| Elongation at break (DIN 53 504) % | 30 | 605 | 580 | 520 | 610 | 530 | 590 | 580 | 610 | 515 |
| Wear (DIN 53 516) mm$^3$ | 41 | 36 | 43 | 42 | 37 | 40 | 38 | 43 | 168 | 143 |
| Density (DIN 53 500) g/cm$^3$ | 1.21 | 1.21 | 1.21 | 1.21 | 1.21 | 1.21 | 1.26 | 1.21 | 1.21 | 1.205 |
| Flame retardancy per VDE 0472 §804 neu | | | | | | | | | | |
| Specimen self-extinguishes after after sec. | 30 | 25 | 40 | 15 | 15 | 35 | 20 | 25 | 35 | 25 |

The embodiments of the invention in which an exclusive property or privilege is claimed are defined as follows:

1. A flame-resistant, thermoplastic polyurethane elastomer comprising per 100 parts by weight of thermoplastic polyurethane elastomer, a flame-retardant additive package consisting of
   (a) from 2 to 10 parts by weight of a compound selected from the group consisting of antimony trioxide, zinc borate and mixtures thereof,
   (b) from 5 to 10 parts by weight of a chlorinated polyethylene, and
   (c) from 5 to 10 parts by weight of a brominated aromatic compound having a moelcular weight of at least about 1700.

2. The flame-resistant, thermoplastic polyurethane elastomer of claim 1 wherein the brominated aromatic compound has a molecular weight of from about 1700 to about 63,000

3. The flame-resistant, thermoplastic polyurethane elastomer of claim 1 wherein the brominated aromatic compound is selected from the group consisting of poly(tetrabromobisphenol-A-glycidyl ether), polytribromostyrene, and poly(tetrabromobisphenol-A-carbonate).

4. The flame-resistant, thermoplastic polyurethane elastomer of claim 1 wherein poly(tetrabromobisphenol-A-glycidyl ether) is the brominated aromatic compound.

5. The flame-resistant, thermoplastic polyurethane elastomer of claim 1 wherein the flame-retardant additive comprises per 100 parts by weight of thermoplastic polyurethane elastomer,
   (a) from 3 to 8 parts by weight of a compound selected from the group consisting of antimony trioxide, zinc borate, and mixtures thereof,
   (b) from 5 to 10 parts by weight chlorinated polyethylene, and
   (c) from 5 to 10 parts by weight poly(tetrabromobisphenol-A-glycidyl ether).

6. The flame-resistant, thermoplastic polyurethane elastomer of claim 1 wherein the thermoplastic polyurethane elastomer is prepared by the reaction of 4,4'-diphenylmethane diisocyanate, polyoxytetramethylene glycol, 1,4-butanediol/1,6-hexanediol polyadipate and 1,4-butanediol.

7. A molded article, film, sheet or cable covering prepared with the thermoplastic polyurethane elastomer of claim 1.

8. A process for the preparation of a flame-resistant, thermoplastic polyurethane elastomer prepared by incorporating into the basic material used to produce a thermoplastic polyurethane elastomer prior to the polyurethane-forming reaction, or into a reaction mixture during the polyurethane forming reaction, or into a finished thermoplastic polyurethane elastomer, a flame-retardant additive package consisting of per 100 parts by weight of thermoplastic polyurethane elastomer
   (a) from 2 to 10 parts by weight of a compound selected from the group consisting of antimony trioxide, zinc borate, and mixtures thereof,
   (b) from 5 to 10 parts by weight chlorinated polyethylene, and
   (c) from 5 to 10 parts by weight brominated aromatic compound having a molecular weight of at least about 1700.

9. The process of claim 8 wherein the brominated aromatic compound has a moelcular weight of from about 1700 to about 63,000

10. The process of claim 8 wherein the brominated aromatic compound is selected from the group consisting of poly(tetrabromobisphenol-A-glycidyl ether), polytribromostyrene, and poly(tetrabromobisphenol-A-carbonate).

11. A molded article, film, sheet or cable covering prepared by the process of claim 8.

12. A flame-resistant thermoplastic polyurethane elastomer containing a flame retarding additive package consisting of:
   (a) a compound selected from the group consisting of antimony trioxide, zinc borate, and mixtures thereof;
   (b) a chlorinated polyethylene; and
   (c) a brominated aromatic compound having a molecular weight of from about 1700 to about 63,000.

* * * * *